May 17, 1938. O. CORDS 2,118,005
ELECTRIC CABLE
Filed July 7, 1936 3 Sheets-Sheet 1
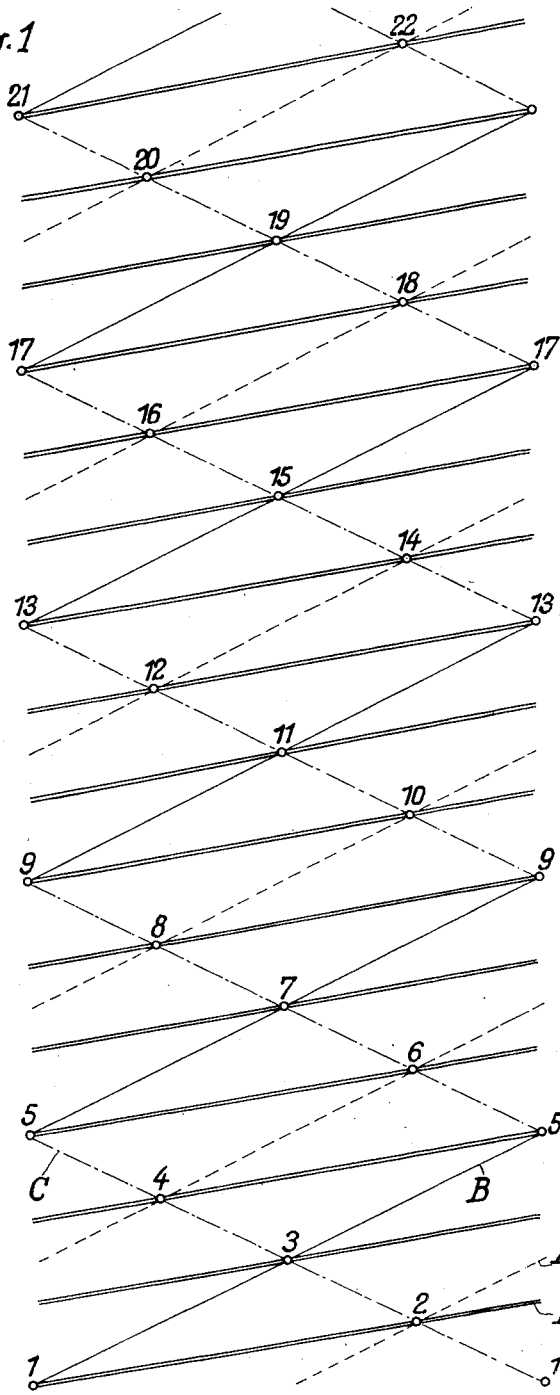
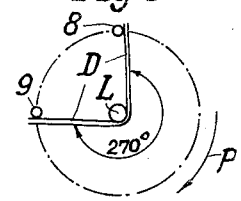
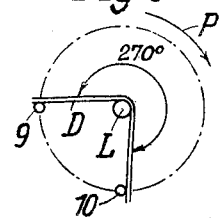
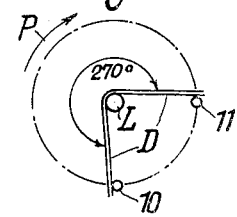
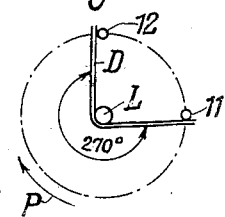
Inventor:
O. Cords
By Glascock Downing & Seebold
Attys.

May 17, 1938.   O. CORDS   2,118,005
ELECTRIC CABLE
Filed July 7, 1936   3 Sheets-Sheet 2

Inventor:
O. Cords
By: Glascock Downing & Seebold
Attys.

May 17, 1938.　　　　O. CORDS　　　2,118,005
ELECTRIC CABLE
Filed July 7, 1936　　　3 Sheets-Sheet 3

Inventor;
O. Cords

Patented May 17, 1938

2,118,005

UNITED STATES PATENT OFFICE 2,118,005

ELECTRIC CABLE

Otto Cords, Berlin-Lichterfelde, Germany, assignor to Norddeutsche Kabelwerke A. G., Berlin-Neukolln, Germany Application July 7, 1936, Serial No. 89,413
In Germany July 22, 1935

17 Claims. (Cl. 173—265)

This invention relates to improvements in electric cables, and more particularly to air-space insulated electric cables of the type comprising a conductor, an outer covering, and supporting means such as tapes or threads, which hold the said conductor in position in relation to the said covering. The outer covering forms either the return conductor, in which case there is produced a concentric air-space insulated cable, or the outer insulation, so that an insulated conductor results which may be combined in pairs, fours or the like as usual in the signalling art.

For certain purposes, as for multiplex telephone systems or television apparatus or also for leads for aerials or photo-cells, cables require to be employed which are capable of transmitting frequencies of up to 1,000,000 periods or more with low damping. These cables, therefore, must exhibit an extremely small capacity and low dielectric losses.

A cable of this description is represented by the concentric cable aforesaid which, in the event of sufficiently large dimensions, possesses the requisite low capacity and, if the central conductor is so supported that the dielectric consists as far as possible of air, a correspondingly low dielectric constant.

It is accordingly the primary object of the invention to provide an improved cable of the character referred to which is capable of transmitting the requisite high frequency by reason of small capacity and low dielectric losses.

A further object is to provide a cable which while being admirably suited for high frequencies is practically immune against external interferences.

A still further object of the invention is to provide a cable of the character referred to which is simple and inexpensive to manufacture and does not call for complicated machines or apparatus.

Other objects and advantages of the invention will become apparent as the description proceeds.

It has been found that a particularly effective and practical form of cable suitable for high frequencies and above all practically immune against external interferences may be obtained by making the outer covering in the form of helical windings and passing the threads which support the conductor within the said covering between the convolutions of the windings. The invention, therefore, is constituted in substance by an air-space insulated electric cable, comprising a central conductor, an outer covering surrounding the said conductor in spacial disposal thereto and comprising helical windings, and helically wound tapes or threads supporting the conductor in relation to the outer covering and disposed between the convolutions of the said windings. The outer covering forms, as stated, either the return conductor or the outer insulation of the cable.

There may be employed for the covering a plurality of loosely wound adjacently disposed or superimposed helical windings, at least one of which is wound in the opposite direction to the others. These windings form intersections over which the supporting thread is passed for the purpose of holding the central conductor securely in position. The supporting thread is conducted over the intersections in such fashion that the same traverses in its direction of winding an angle of at least 180° between two adjacent intersections.

Preferably, three helical windings are provided, two of which are wound in the same direction. The windings may be secured in their relative positions by means of a common covering. The supporting means itself consists of a thread exhibiting the smallest possible dielectric losses. When made of metal the covering composed of the helical windings forms electrically an adequate screen against external interferences. The helically wound covering may consist of wires or tapes or wires and tapes. As will be obvious from the later description however, the use of tapes is to be preferred.

In one embodiment according to the invention the covering consists of two tapes wound in opposite directions. The one tape is wider than the other, and the pitch of the winding is such that between the convolutions gaps are formed which are narrow as compared with the width of the tape. These gaps are bridged at certain intervals by the outer, narrower band, supporting bars thus being formed, oved which there is conducted the supporting thread. The supporting thread is wound during the production of the cable in the gaps between the convolutions of the wider band.

In another constructional form the covering consists of a multiple band winding and a single band winding wound in the opposite sense. In this case, it is possible to support the conductor by means of several threads, since the number of threads corresponds to the number of elements in the multiple tape winding. For example, in a multiple winding consisting of two tapes there are two relatively displaced gaps, in which can be laid two independently guided threads for supporting the conductor. Apart from the mechanically strong but flexible construction there is obtained a greater security, since, when one supporting thread breaks, the second thread will continue to support the conductor. Moreover, the intervals at which the threads touch the conductor are smaller, without the capacity of the conductor being detrimentally increased by this arrangement.

In order additionally to secure the portions of the supporting threads which emerge beyond the normal periphery of the outer covering at the points of intersection of the tapes there may be provided an additional outer winding in the form of one or more thin tapes preferably composed of a material having very low dielectric losses.

If the tape forming the covering consists of an insulating material, a metallic layer forming the return lead can be provided on the tape. This return conductor can also consist for example of metal tapes wound over the covering with a long pitch and forming a closed layer. In some circumstances a lead sheathing surrounding the tapes will suffice as a return conductor. If, however, the electrical resistance of the lead sheathing should be too great, the above described layer of metal tapes may be provided under the lead sheath.

The invention is illustrated diagrammatically and by way of example in the accompanying drawings, in which Fig. 1 is a developed view of the covering of the electric cable, which in this case consists of three wires. Instead of the wires, obviously tapes could also be used.

Figs. 2 to 5 are cross-sections through the conductor at different points in order to show the formation of loops of the supporting thread.

Figure 6:
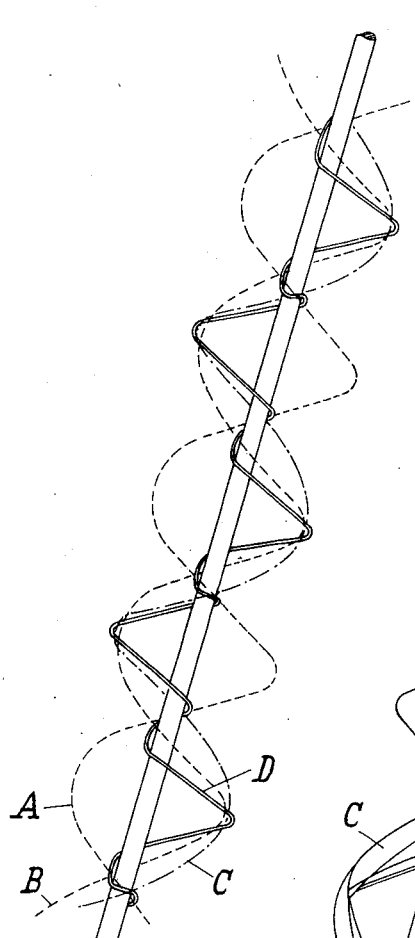
Fig. 6 is a perspective view of the cable according to Fig. 1.

In the embodiment according to Figs. 1 to 6 the outer covering comprises three helically wound wires A, B and C. Wires of resilient material are preferably used for this purpose. In the example illustrated, two of these wires, for example A and B, are wound with the same pitch and in the same sense, but are staggered. The third wire C is wound in the opposite direction over the two wires A and B, so that as clearly shown by the developed view in Fig. 1 the winding C intersects at a number of points with the windings A and B. These points of intersection are indicated in Fig. 1 by the reference numerals 1—22. The points of intersection are relatively displaced by 90° in the direction of winding of the wire C.

Over this system of helically wound wires there is conducted in particular manner a supporting thread designated D in Fig. 1. This thread is wound with half the pitch of the windings A and B in the same direction as these. In this direction the thread requires to pass through an angle of 270° between one point of intersection and the next. It is accordingly disposed between the two windings A and B in a mesh, which is determined, for example, by the points 9, 8, 10, and 11.

In Figs. 2 to 5 the points of intersection corresponding to Fig. 1 are indicated. The thread guided in the direction of the arrow P runs in Fig. 2 over the point of intersection 8, and then, after having passed through 270° reaches the point of intersection 9. This has the result that the thread embraces the central conductor in a right angle.

From Fig. 3 it is seen that the thread in the direction of the arrow P, after passing round the point of intersection 9, reaches the point 10 after another 270°. The surrounding of the central conductor L by the thread D in Fig. 3 is displaced by 90° as compared with Fig. 2. In Figure 4 a further position is shown where the thread D runs over the point of intersection 11 and thereby again embraces the central conductor L.

According to Fig. 5 the thread D passes round the point 11 and through 270° to the point 12, again embracing the central conductor L.

The four angles which the supporting thread encloses in the four figures, 2 to 5, are, as shown by the drawings, always displaced by 90°. In this way, there is obtained a completely satisfactory supporting of the central conductor L by the thread D with respect to the wire helix system concentrically surrounding the central conductor and consisting of three windings A, B and C. The conductor L is held fast in its axial position.

Fig. 6 shows a perspective view of the electric conductor. The wire helices and the supporting thread are indicated in this figure in the arrangement according to Fig. 1, the two windings A and B laid in the same direction being shown in broken lines, and the winding in the opposite sense being in dot and dash lines, while the supporting thread D is shown as a double line.

A number of conductors of the above described type could be combined to form a cable, in which case, preferably the frequency band to be transmitted would be distributed over the separate conductors. Instead of the wires, tapes may be used, as in the constructional forms described below.

Figure 7:
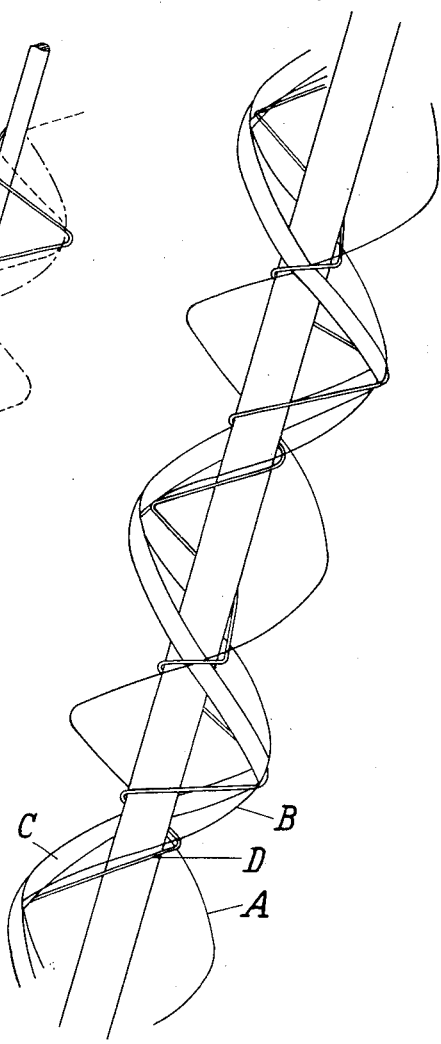
Fig. 7 is a perspective view of a further form of the cable in which the covering consists of two wire windings and one tape winding.

In the constructional form according to Fig. 7, the outer covering of the electric conductor consists of the two wire windings A and B, wound in the same direction and uniformly displaced. The winding C in the opposite direction consists of a tape, while D is the holding thread.

Figure 8:
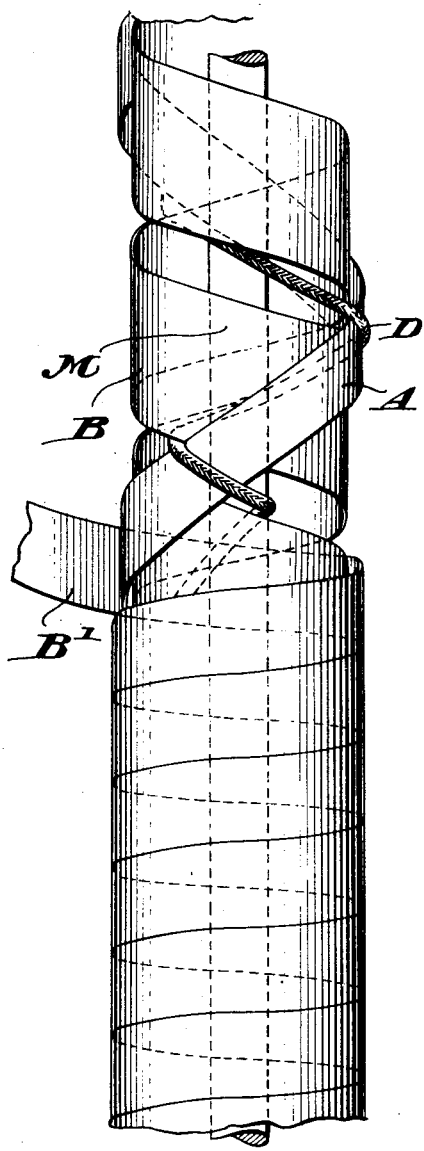
Fig. 8 shows a further modification in which the covering consists of two tape windings.

In the constructional form according to Fig. 8, the outer covering of the electric conductor consists of the two tapes A and B. M is the central conductor which is held in relation to the outer covering by the thread D. It will be seen from the drawings that the band B is broader than the tape A. In the constructional example the tape A is wound over the band B. The reverse arrangement is also possible.

Fig. 8 shows the application of an additional outer winding E' in the form of one or more thin tapes of paper or the like and it will be understood that this additional winding may be applied to the several other forms of the invention disclosed.

Figure 9:
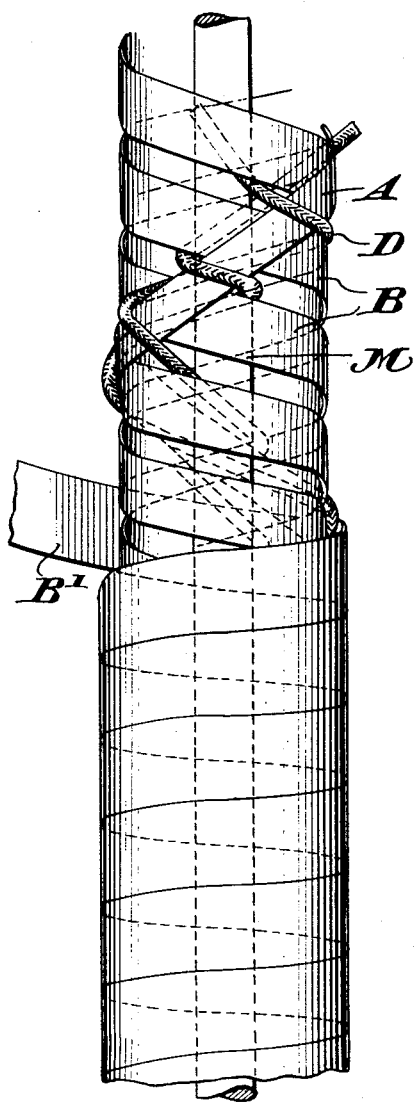
Fig. 9 shows a further constructional form of the covering, which is constructed of one multiple and one single tape winding.

In the constructional form according to Fig. 9, two tape helices wound in the same sense are indicated by B above, which is an oppositely wound tape A. The conductor M is held in its position by two supporting threads D. Instead of the two tape windings B and the two supporting threads D several tape windings and threads could be used.

What I claim is:

1. An air-space insulated electric cable comprising a central conductor, an outer covering surrounding the said conductor in spacial relation thereto and including helical windings, and helically wound supporting means supporting the said conductor with relation to the said outer covering and disposed between the convolutions of the said windings.

2. An air-space insulated electric cable comprising a central conductor, an outer covering surrounding the said conductor in spacial relation thereto and including a plurality of helical windings, at least one of the said windings being wound in opposite direction to the remaining windings, and helically wound supporting means supporting the said conductor with relation to the said outer covering, the said supporting means being disposed between the convolutions of the said windings and passing over the points of intersection of the said oppositely wound windings.

3. An air-space insulated electric cable comprising a central conductor, an outer covering surrounding the said conductor in spacial relation thereto and including a plurality of helical windings, at least one of the said windings being wound in opposite direction to the remaining windings, and helically wound supporting means supporting the said conductor with relation to the said outer covering, the said supporting means being disposed between the convolutions of the said windings and passing over the points of intersection of the said oppositely wound windings, and the said oppositely wound windings being so disposed in relation to one another that the said supporting means traverse in the direction of winding an angle of at least 180° between each two successive points of intersection.

4. An air-space insulated electric cable comprising a central conductor, an outer covering surrounding the said conductor in spacial relation thereto and including three helical windings, one of the said windings being wound in opposite direction to the two remaining windings, and helically wound supporting means supporting the said conductor in relation to the said conductor covering and disposed between the convolutions of the said windings.

5. An air-space insulated electric cable comprising a central conductor, an outer covering surrounding the said conductor in spacial relation thereto and including helical windings, and helically wound supporting means consisting of a material exhibiting low dielectric losses, the said supporting means supporting the said conductor with relation to the said outer covering and being disposed between the convolutions of the said windings.

6. An air-space insulated electric cable comprising a central conductor, an outer covering surrounding the said conductor in spacial relation thereto and including a plurality of helical windings, at least one of the said windings consisting of a tape, and helically wound supporting means supporting the said conductor with relation to the said outer covering and disposed between the convolutions of the said windings.

7. An air-space insulated electric cable comprising a central conductor, an outer covering surrounding the said conductor in spacial relation thereto and including helical windings composed of wire, and helically wound supporting means supporting the said conductor with relation to the said outer covering and disposed between the convolutions of the said windings.

8. An air-space insulated electric cable comprising a central conductor, an outer covering surrounding the said conductor in spacial relation thereto and including three helical windings, one of the said windings consisting of tape and the other two windings consisting of wire and one of the said windings being wound in opposite direction to the two remaining windings, and helically wound supporting means supporting the said conductor with relation to the said outer covering and disposed between the convolutions of the said windings.

9. An air-space insulated electric cable, comprising a central conductor, an outer covering surrounding the said conductor in spacial relation thereto and including two helical windings consisting of tape, the said windings being wound in opposite directions, and helically wound supporting means supporting the said conductor with relation to the said outer covering and disposed between the convolutions of the said windings.

10. An air-space insulated electric cable comprising a central conductor, an outer covering surrounding the said conductor in spacial relation thereto and including two helical windings consisting of tape, the tape of the one winding being wider than the tape of the other winding, and helically wound supporting means supporting the said conductor with relation to the said outer covering and disposed between the convolutions of the said windings.

11. An air-space insulated electric cable, comprising a central conductor, an outer covering surrounding the said conductor in spacial relation thereto and including two helical windings consisting of tape, the tape of the one winding being wider than the tape of the other winding and the said windings being wound in opposition to each other, and the wider-tape winding being wound with such pitch that gaps which are narrow compared with the width of the tape are formed between adjacent convolutions and are bridged at definite intervals by the narrower-tape winding to form intersections, and helically wound supporting means supporting the said conductor with relation to the said outer covering, the said supporting means being disposed between the convolutions of the said windings and passing over the said intersections.

12. An air-space insulated electric cable, comprising a central conductor, an outer covering surrounding the said conductor in spacial relation thereto and including a multiple tape winding and a single tape winding wound in opposition to the said multiple tape winding, and helically wound supporting means supporting the said conductor with relation to the said outer covering and disposed between the convolutions of the said windings.

13. An air-space insulated electric cable comprising a central conductor, an outer covering surrounding the said conductor in spacial relation thereto and including helical windings, helically wound supporting means supporting the said conductor with relation to the said outer covering and disposed between the convolutions of the said windings, and an additional covering wound over the said first covering to secure the parts of the supporting means which project beyond the normal periphery of the said first covering.

14. An air-space insulated electric cable, comprising a central conductor, an outer covering surrounding the said conductor in spacial relation thereto and including helical windings, and supporting means including helically wound thread for supporting the said conductor with relation to the said outer covering, the said thread being disposed between the convolutions of the said windings.

15. An air-space insulated electric cable comprising a central conductor, an outer covering surrounding the said conductor in spacial relation thereto and including helical windings, and helically wound threads for supporting the said conductor with relation to the said outer covering and disposed between the convolutions of the said windings, the said threads corresponding in number to the number of windings.

16. An air-space insulated electric cable, comprising a central conductor, an outer covering surrounding the said conductor in spacial relation and including helical windings, and helically wound supporting means supporting the said conductor with relation to the said outer covering and disposed between the convolutions of the said windings, the said covering constituting the outer confinement of the insulating air space of the cable.

17. An air-space insulated electric cable comprising a central conductor, an outer covering surrounding the said conductor in spacial relation thereto and including helical windings, and helically wound supporting means supporting the said conductor with relation to the said outer covering and disposed between the convolutions of the said windings, the said outer covering constituting the return conductor of the cable.

OTTO CORDS.